United States Patent
Gatzka et al.

(10) Patent No.: US 11,982,251 B2
(45) Date of Patent: May 14, 2024

(54) AIR SUPPLY DEVICE WITH INTAKE PIPES THAT OVERLAP IN AN AIR CHAMBER, INTERNAL COMBUSTION ENGINE WITH AN AIR SUPPLY DEVICE, AND MOTOR VEHICLE

(71) Applicant: Bayerische Motoren Werke Aktiengesellschaft, Munich (DE)

(72) Inventors: Norbert Gatzka, Eching (DE); Johannes Hoehl, Ortsteil Oberlappach (DE); Josef Miritsch, Gerolsbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/026,422

(22) PCT Filed: Aug. 9, 2021

(86) PCT No.: PCT/EP2021/072130
§ 371 (c)(1),
(2) Date: Mar. 15, 2023

(87) PCT Pub. No.: WO2022/058090
PCT Pub. Date: Mar. 24, 2022

(65) Prior Publication Data
US 2023/0349347 A1  Nov. 2, 2023

(30) Foreign Application Priority Data
Sep. 16, 2020  (DE) ..................... 10 2020 124 070.8

(51) Int. Cl.
*F02M 35/10*   (2006.01)
*F02M 35/104*  (2006.01)
*F02M 35/16*   (2006.01)

(52) U.S. Cl.
CPC .... *F02M 35/104* (2013.01); *F02M 35/10255* (2013.01); *F02M 35/162* (2013.01)

(58) Field of Classification Search
CPC ........... F02M 35/104; F02M 35/10255; F02M 35/162; F02M 35/10
See application file for complete search history.

(56) References Cited

U.S. PATENT DOCUMENTS

| | | |
|---|---|---|
| 3,783,845 A | 1/1974 | Brandstetter |
| 5,537,965 A | 7/1996 | Toepfer et al. |

(Continued)

FOREIGN PATENT DOCUMENTS

| | | |
|---|---|---|
| DE | 10 2013 021 611 A1 | 6/2015 |
| JP | 2010-270734 A | 12/2010 |

(Continued)

OTHER PUBLICATIONS

International Search Report (PCT/ISA/210) issued in PCT Application No. PCT/EP2021/072130 dated Sep. 16, 2021 with English translation (five (5) pages).

(Continued)

*Primary Examiner* — Syed O Hasan
(74) *Attorney, Agent, or Firm* — Crowell & Moring LLP

(57) ABSTRACT

An air supply device for an internal combustion engine may include at least one air chamber and at least two intake pipes, which are connected to the at least one air chamber. The intake pipes may each be designed to supply air to respective cylinders of the internal combustion engine, and they each may have intake pipe end portion assigned to a corresponding inlet opening. Via the inlet openings, air can move from an air chamber interior of the at least one air chamber into respective intake pipe interiors of the at least two intake pipes and also via the intake pipe interiors to the cylinders. The intake pipe end portions may end in the air chamber (Continued)

interior and overlap in at least one direction, which is oriented perpendicularly to at least one center axis of at least one of the intake pipe end portions at a common overlapping region.

16 Claims, 3 Drawing Sheets

(56) References Cited

U.S. PATENT DOCUMENTS

| | | | |
|---|---|---|---|
| 2003/0015161 A1* | 1/2003 | Ozeki | F02B 27/0215 |
| | | | 123/184.55 |
| 2003/0121508 A1* | 7/2003 | Klas | F02M 26/19 |
| | | | 123/184.21 |
| 2005/0188959 A1 | 9/2005 | Udono | |

FOREIGN PATENT DOCUMENTS

| | | |
|---|---|---|
| JP | 2010270734 A * | 12/2010 |
| WO | WO 94/04814 A1 | 3/1994 |

OTHER PUBLICATIONS

German-language Written Opinion (PCT/ISA/237) issued in PCT Application No. PCT/EP2021/072130 dated Sep. 16, 2021 (five (5) pages).
German-language Office Action issued in German Application No. 10 2020 124 070.8 dated Nov. 30, 2020 (nine (9) pages).
Cover Page of EP 0 656 993 A1 published Jun. 14, 1995 (one (1) page).

* cited by examiner

AIR SUPPLY DEVICE WITH INTAKE PIPES THAT OVERLAP IN AN AIR CHAMBER, INTERNAL COMBUSTION ENGINE WITH AN AIR SUPPLY DEVICE, AND MOTOR VEHICLE

BACKGROUND AND SUMMARY

The invention relates to an air supply apparatus for an internal combustion engine. Further aspects of the invention relate to an internal combustion engine with an air supply apparatus, and to a motor vehicle with an air supply apparatus and/or an internal combustion engine.

In the case of air supply apparatuses of this type, air which is required for the combustion of fuel in respective combustion chambers of an internal combustion engine passes into an air collector of the air supply apparatus and via respective intake manifolds of the air supply apparatus which is connected to the air collector to respective cylinders of the internal combustion engine which are assigned the respective combustion chambers.

Thus, for example, an intake system for an internal combustion engine is to be gathered as known from EP 0 656993 A1, with a vacuum distributor which comprises a vessel and has an intake stub on the inflow side and a plurality of individual intake manifolds on the outflow side which open into a cylinder head of the internal combustion engine and are connected to the individual cylinders. The intake stub has an air guiding device which extends approximately as far as a plane which runs between the two middle intake manifolds, and a wall, directed toward the inner openings of the intake manifolds, of the air guiding device is arranged spaced apart from these openings.

It is an object of the present invention to provide an air supply apparatus, an internal combustion engine and a motor vehicle of the type mentioned at the outset, in the case of which a homogeneous air supply of a plurality of cylinders during internal combustion engine operation can be achieved and an existing installation space can be utilized particularly effectively.

This object is achieved by way of an air supply apparatus with the features of patent claim 1, by way of an internal combustion engine with the features of patent claim 8, and by way of a motor vehicle with the features of patent claim 10. Advantageous refinements with expedient developments of the invention are specified in the subclaims.

A first aspect of the invention relates to an air supply apparatus for an internal combustion engine, with at least one air collector, and with at least two intake manifolds which, connected to the at least one air collector, are configured in each case to supply air to respective cylinders of the internal combustion engine, and which have respective intake manifold end portions which are assigned in each case at least one inlet opening, via which air from an air collector interior space of the at least one air collector can be introduced into respective intake manifold interior spaces of the at least two intake manifolds and can be fed via the intake manifold internal spaces to the cylinders. The air collector can be called what is known as an airbox. The air supply apparatus can have at least one inflow opening, via which air from a surrounding area of the air supply apparatus can enter into the air collector interior space.

The air supply apparatus can comprise at least one inflow channel which is configured for the intake of air from the surrounding area of the air supply apparatus and can also be called an intake channel. The air supply apparatus can also comprise at least one filter element which can be configured and arranged for filtering air which enters via the at least one inflow opening at least indirectly into the air collector interior space. The air supply apparatus can comprise a filter container for receiving the filter element, which filter container can be assigned to the air collector.

It is provided according to the invention that the respective intake manifold end portions of the at least two intake manifolds end in the air collector interior space and overlap on a common overlap region in at least one direction which is oriented perpendicularly with respect to at least one center axis of at least one of the intake manifold end portions. This is advantageous, since what is known as crosstalk between the intake manifolds, that is to say a transmission of pressure pulses which are due to the charge exchange and are produced during operation of the internal combustion engine between the intake manifolds, can be decreased considerably by way of the overlap of the intake manifold end portions on the common overlap region, which can ensure that a homogeneous air supply of the respective cylinders takes place via the corresponding intake manifolds. Moreover, an installation space which is present in the air collector interior space can be utilized particularly effectively by way of the overlap in the overlap region. The intake manifolds can enter the air collector interior space at opposite air collector sides of the air collector. Accordingly, respective intake manifold portions which are arranged outside the air collector interior space and are coupled to the intake manifold end portions can run at least in regions along the air collector sides which lie opposite one another and can also be called air collector wall regions of the air collector. As a result, a homogeneous arrangement of the intake manifolds is made possible, and existing installation space can be utilized particularly advantageously.

The invention is based on the finding that, as a result of the overlap in regions of the intake manifolds on the intake manifold end portions, firstly a particularly space-saving arrangement is provided and, moreover, the crosstalk between the intake manifolds can be considerably reduced or even completely avoided. Moreover, the overlap opens up, for example, further possibilities for fastening the respective intake manifolds. For instance, the respective intake manifolds can be coupled to one another for example, at their intake manifold end portions in the air collector interior space. As a result, there is particularly stable fastening of the respective intake manifolds not only to the at least one air collector, but rather also to one another and at a spacing from the air collector wall regions and in the air collector interior space.

In one advantageous development of the invention, the respective at least one inlet openings face away from one another. This is advantageous, since the crosstalk between the intake manifolds can be particularly effectively decreased or even completely ruled out by way of the inlet openings which face away from one another. The expression, in accordance with which the respective inlet openings face away from one another, can be understood within the context of the present disclosure such that the respective inlet openings can face, for example, in each case one air collector wall region of the air collector wall regions of the air collector which lie opposite one another.

In a further advantageous development of the invention, the air supply apparatus comprises at least two throttle elements for setting respective air quantities which can be fed to the cylinders via the at least two intake manifolds, and the at least two throttle elements are coupled in each case at least indirectly to an actuating element, where the throttle elements can be adjusted jointly via the actuating element.

This is advantageous, since a particularly low-complexity operation of the at least two throttle elements can take place as a result via the actuating element, in particular the common actuating element. In general, in each case one of the throttle elements can be assigned to in each case one of the intake manifolds. In other words, in each case one of the throttle elements can therefore be arranged on each of the intake manifolds.

In a further advantageous development of the invention, at least one of the at least two throttle elements is arranged in the air collector interior space. This is advantageous, since a particularly space-saving arrangement of the corresponding throttle element within the air collector interior space and, in addition, particularly wide-ranging protection of the corresponding throttle element against any environmental influences are provided. The at least two throttle elements, in particular all the throttle elements, of the air supply apparatus are preferably arranged in the air collector interior space, as a result of which a particularly space-saving arrangement is provided.

In a further advantageous development of the invention, the at least two throttle elements can be adjusted synchronously with the at least one actuating element. This is advantageous, since a particularly homogeneous air supply of the respective cylinders of the internal combustion engine via the respective intake manifolds can be ensured as a result. As a result, for example, impermissibly pronounced rotational non-uniformities of a crankshaft of the internal combustion engine which can be driven with respective pistons of the internal combustion engine which are assigned to the cylinders can be decreased.

In a further advantageous development of the invention, the at least two throttle elements are configured as respective throttle valves. This is advantageous, since the throttle elements which are configured as throttle valves have a particularly simple and robust construction and can be adjusted with particularly low complexity for the targeted air supply of the respective cylinders of the internal combustion engine.

In a further advantageous development of the invention, the at least one actuating element is configured as a shaft. This is advantageous, since the actuating element which is configured as a shaft has a particularly simple and robust construction. In addition, the shaft can be mounted rotatably in a space-saving and low-complexity manner on respective bearings of the air supply apparatus which are arranged on the respective intake manifold end portions.

A second aspect of the invention relates to an internal combustion engine with an air supply apparatus in accordance with the first aspect of the invention. In the case of this internal combustion engine, a homogeneous air supply of a plurality of cylinders during combustion engine operation can be achieved and an existing installation space can be utilized particularly effectively.

In one advantageous development of the invention, the internal combustion engine comprises at least two cylinder banks, and at least one of the cylinders is assigned to in each case one of the cylinder banks. The cylinder banks can enclose any desired bank angle between one another, with the result that the internal combustion engine can be configured, for example, as a V-engine. Independently of the bank angle, an advantageous air supply of the respective cylinders via the air supply apparatus is ensured. The internal combustion engine can preferably be configured as a boxer engine. This is advantageous, since the cylinders of the internal combustion engine can be arranged as a result in what is known as a boxer arrangement and therefore so as to lie opposite one another, that is to say at a bank angle of 180°, as a result of which the internal combustion engine can have a particularly low overall height.

A third aspect of the invention relates to a motor vehicle, in particular a motorcycle, with an air supply apparatus in accordance with the first aspect of the invention and/or with an internal combustion engine in accordance with the second aspect of the invention. In the case of the internal combustion engine of the motor vehicle, a homogeneous air supply of a plurality of cylinders can be achieved during internal combustion engine operation, and an existing installation space can be utilized particularly effectively. The respective cylinders of the internal combustion engine can be arranged horizontally and, as a result, in a plane which extends in the longitudinal extent direction and transverse extent direction of the motor vehicle. In this plane, respective pistons, assigned to the respective cylinders, of the internal combustion engine can move up and down, as a result of which the internal combustion engine requires a particularly small amount of installation space in a vertical extent direction of the motor vehicle which is oriented perpendicularly with respect to this plane. The motor vehicle can particularly preferably be configured as a motorcycle, in the case of which a horizontal arrangement of this type of the cylinders has the effect of saving a particular amount of installation space.

The preferred embodiments, proposed in relation to one of the aspects, and their advantages apply accordingly to the respective other aspects of the invention, and vice versa.

The features and combinations of features mentioned above in the description and the features and combination of features mentioned below in the description of the figures and/or shown solely in the figures can be used not only in the respectively specified combination, but rather also in other combinations or on their own, without departing from the scope of the invention.

Further advantages, features and details of the invention result from the claims, the following description of preferred embodiments and on the basis of the drawings.

BRIEF DESCRIPTION OF THE DRAWINGS

In the following text, certain aspects are explained on the basis of one specific embodiment. In this regard, in the figures.

DETAILED DESCRIPTION OF THE DRAWINGS

Figure 1:
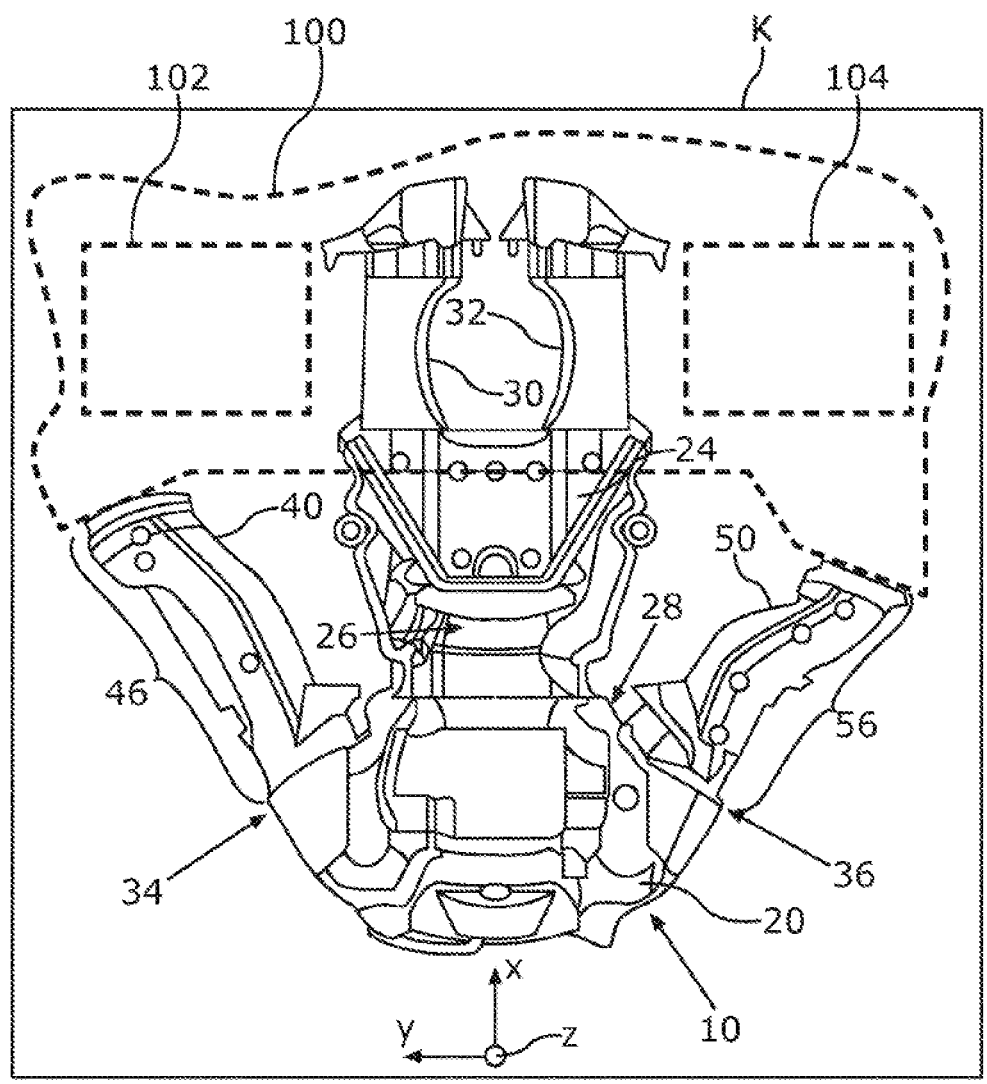
FIG. 1 shows a perspective plan view of a diagrammatically illustrated air supply apparatus of an internal combustion engine which is shown in a greatly abstract illustration, the internal combustion engine being arranged in a motor vehicle which is shown in a greatly abstract manner and is configured as a motorcycle.

FIG. 1 shows a greatly abstract illustration of a motor vehicle K which is configured in the present case as a motorcycle. The motor vehicle K comprises an internal combustion engine 100 which is likewise shown in an abstract manner and in the present case using dotted lines and in details, which internal combustion engine 100 is configured as a boxer engine and comprises an air supply apparatus 10. The internal combustion engine 100 can in principle comprise at least two cylinder banks which fundamentally enclose any desired bank angle with one another. Here, in each case one of the cylinders 102, 104 can be assigned to in each case one of the cylinder banks, as can also be seen on the basis of FIG. 1.

The internal combustion engine 100 comprises two cylinders 102, 104, namely a first cylinder 102 and a second cylinder 104 which are arranged in a boxer arrangement and therefore so as to lie opposite one another at a bank angle of 180°. The cylinders 102, 104 are arranged horizontally, for which reason respective cylinder center axes (not shown) of the cylinders 102, 104 lie in a plane which extends in the longitudinal extent direction x and in the transverse extent direction y of the motor vehicle K, the internal combustion engine 100 and the air supply apparatus 10. Respective pistons of the internal combustion engine 100 which are assigned to the cylinders 102, 104 but are not shown in further detail in the present case for reasons of clarity move in this plane and along the cylinder center axes during internal combustion engine operation of the internal combustion engine 100.

The longitudinal extent direction x is likewise illustrated in the present case, just like the transverse extent direction y, by respective arrows in FIG. 1. A vertical extent direction z of the motor vehicle K, the internal combustion engine 100 and the air supply apparatus 10 is oriented perpendicularly with respect to this plane.

The air supply apparatus 10 comprises two inflow channels 30, 32 in the present case, namely a first inflow channel 30 and a second inflow channel 32. The inflow channels 30, 32 can also be called intake snorkels. In addition, the air supply apparatus 10 comprises a filter container 24 in which a filter element which is not shown in further detail and is configured as an air filter in the present case is received. Furthermore, the air supply apparatus 10 comprises an air collector 20. For the air supply of the internal combustion engine 100, air from a surrounding area of the motor vehicle K, the internal combustion engine 100 and the air supply apparatus 10 passes via the inflow channels 30, 32 and through respective inflow openings which are not shown in further detail in the present case and can be assigned to the inflow channels 30, 32 at least indirectly into an air collector interior space 22 (can be seen in FIG. 2 and FIG. 3) of the air collector 20.

In the present case, the air passes via the inflow openings (not shown) first of all into the filter container 24, and passes through the filter element and enters into a clean air region 26 of the air collector 20, which clean air region 26 is connected downstream of the filter container 24 in the longitudinal extent direction x. From the clean air region 26, the air which is filtered using the filter element passes into a removal region 28 of the air collector 20. In the present case, the clean air region 26 is situated between the filter container 24 and the removal region 28 in the longitudinal extent direction x. The air collector interior space 22 can extend via the clean air region 26 and via the removal region 28.

In addition, the air supply apparatus 10 comprises two intake manifolds 40, 50, namely a first intake manifold 40 and a second intake manifold 50. The intake manifolds 40, 50 are connected at the removal region 28 to the air collector 20, and serve in each case for the air supply of the respective cylinders 102, 104 during the internal combustion engine operation of the internal combustion engine 100. During the internal combustion operation, air for the combustion of fuel and therefore for the movement of the pistons can be fed via the intake manifolds 40, 50 to respective combustion chambers (not shown) which are assigned to the cylinders 102, 104. Respective intermittently opening and closing inlet valves and outlet valves of the internal combustion engine 100 which are assigned to the respective cylinders 102, 104 in order to carry out gas exchanges are likewise not shown in further detail in the present case for reasons of clarity.

The first cylinder 102 is connected via the first intake manifold 40 to the air collector 20, whereas the second cylinder 104 is connected via the second intake manifold 50 to the air collector 20.

A particularly advantageous utilization of an existing installation space results, for example, by virtue of the fact that the intake manifolds 40, 50 are arranged so as to lie opposite one another in the transverse extent direction y, and are accordingly connected to the air collector 20 on air collector wall regions 34, 36 of the air collector 20 which lie opposite one another in the transverse extent direction y. The first intake manifold 40 is connected here to the first air collector wall region 34, and the second intake manifold 50 is connected to the second air collector wall region 36.

The first intake manifold 40 has a first intake manifold interior space 41, a first intake manifold portion 46, and a first intake manifold end portion 42 which is connected at least indirectly to the latter, in particular in one piece, and has a first inlet opening 44. The second intake manifold 50 has a second intake manifold interior space 51, a second interior manifold portion 56, and a second intake manifold end portion 52 which is connected at least indirectly to the latter, in particular in one piece, and has a second inlet opening 54. The respective inlet manifold portions 46, 56 of the intake manifolds 40, 50 run in each case outside the air collector interior space 22, whereas the intake manifold end portions 42, 52 of the intake manifolds 40, 50 run inside the air collector interior space 22.

Via the inlet openings 44, 54, the (previously filtered) air from the air collector interior space 22 of the air collector 20 can be introduced into the respective intake manifold interior spaces 41, 51 of the respective intake manifolds 40, 50, and can be fed via the intake manifold interior spaces 41, 51 to the respective cylinders 102, 104.

Figure 2:
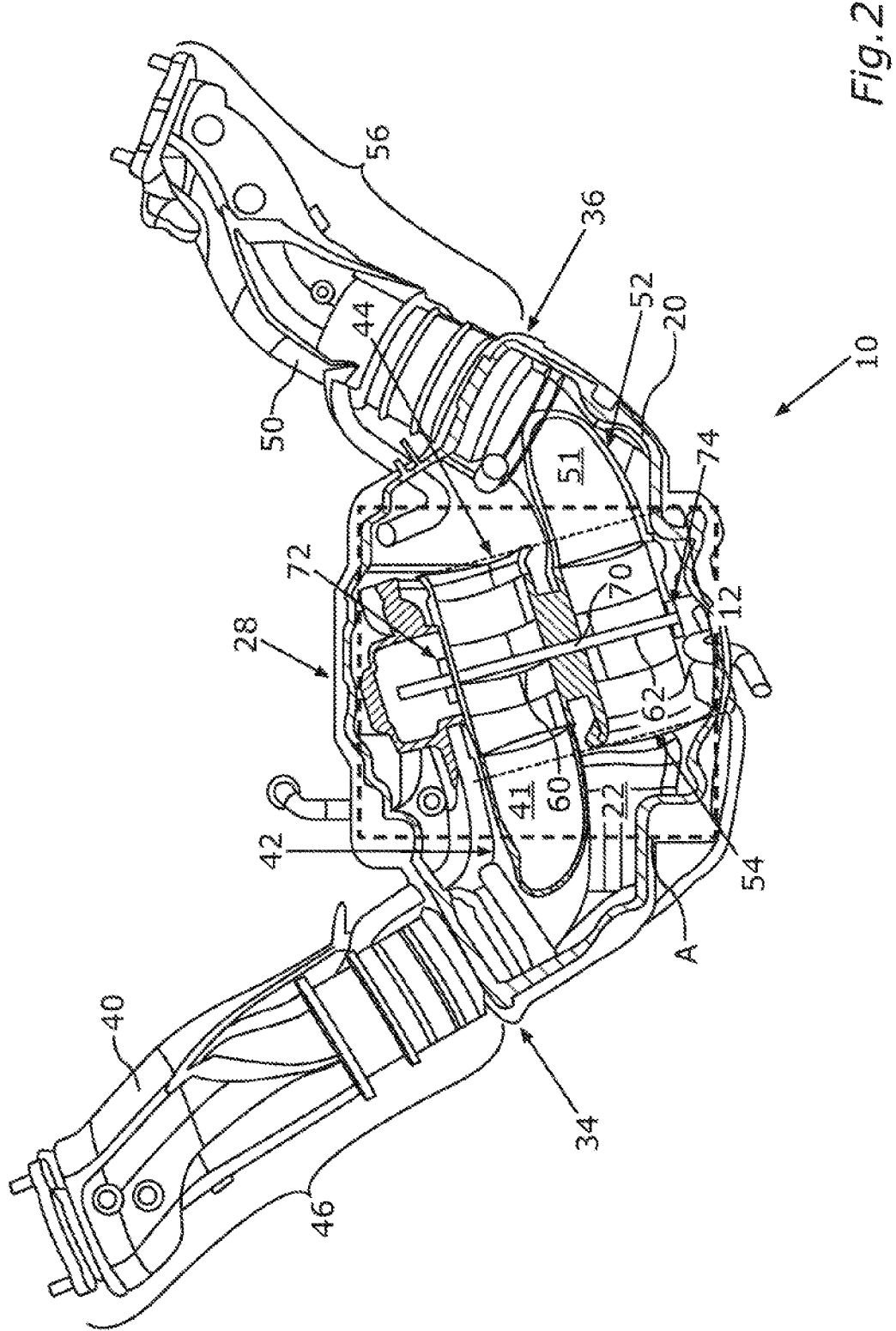
FIG. 2 shows a diagrammatic perspective illustration of the air supply apparatus, in the case of which an air collector of the air supply apparatus is shown in a sectional illustration, and respective intake manifold end portions of two intake manifolds of the air supply apparatus are connected to the air collector on air collector wall regions of the air collector which lie opposite one another, and are introduced into an air collector interior space of the air collector.
Figure 3:
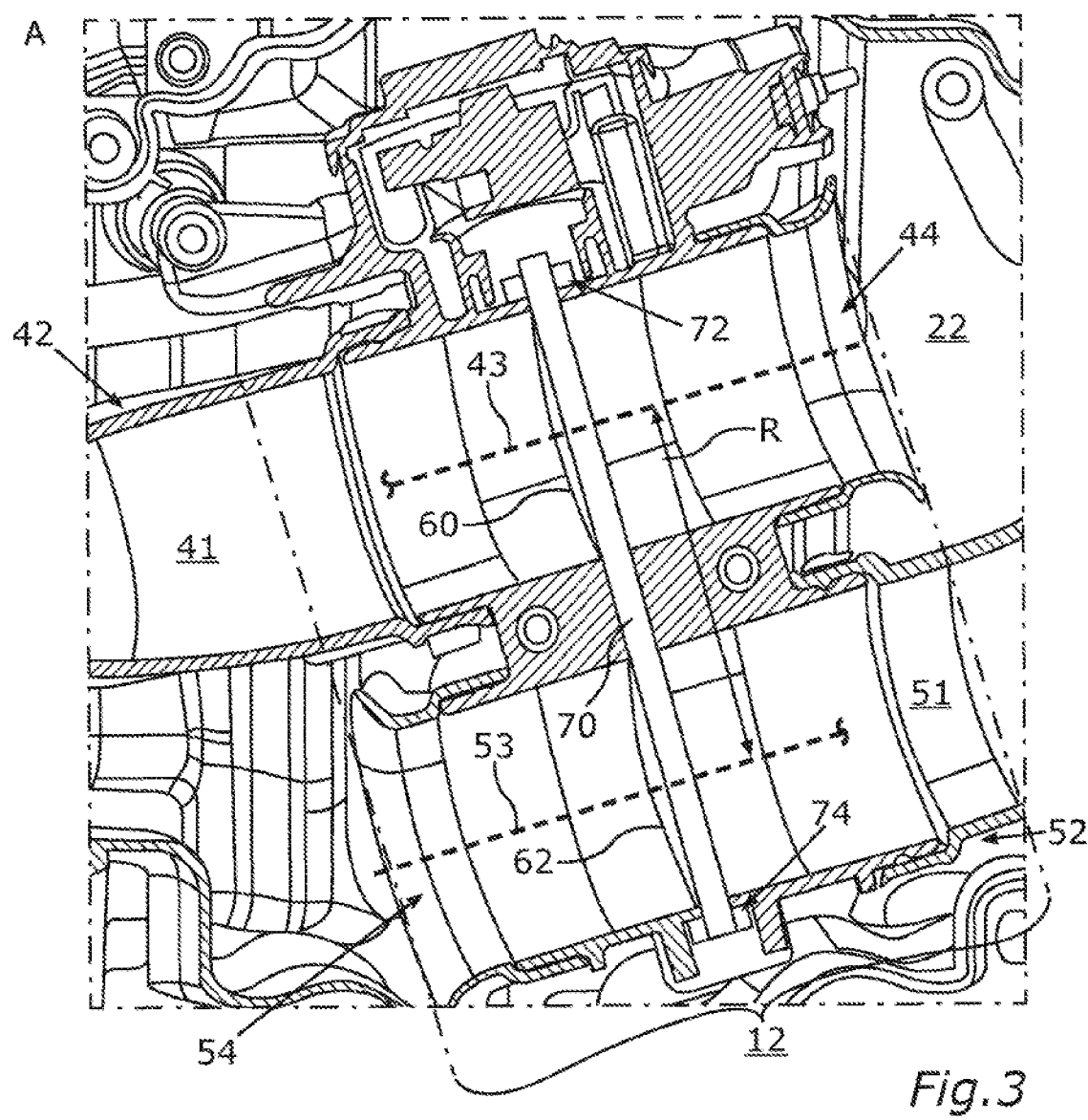
FIG. 3 shows an enlarged illustration of a region A which is bordered using dashed lines in FIG. 2.

The respective intake manifold end portions 42, 52 of the intake manifolds 40, 50 end in the air collector interior space 22, as can be seen in FIG. 2 and FIG. 3. Moreover, the intake manifold end portions 42, 52 overlap on a common overlap region 12 in a direction R which is illustrated by a double arrow in FIG. 2. In the present case, the direction R corresponds to a radial extent direction of the respective intake manifold end portions 42, 52. The direction R can generally be oriented perpendicularly both with respect to a first center axis 43 of the first intake manifold end portion 42 and perpendicularly with respect to a second center axis 53 of the second intake manifold end portion 52, as can likewise be seen on the basis of FIG. 2 and FIG. 3.

FIG. 2 and FIG. 3 likewise show that the first inlet opening 44 and the second inlet opening 54 face away from one another. Here, the first inlet opening 44 faces the second air collector wall region 36, that is to say is open toward the second air collector wall region 36, whereas the second inlet opening 54 faces the first air collector wall region 34, that is to say is open toward the first air collector wall region 34. A crosstalk between the respective intake manifolds 40, 50 can be counteracted in a particularly favorable way by way of this orientation of the respective inlet openings 44, 54.

FIG. 2 and FIG. 3 show, in sectioned form, two throttle elements 60, 62 which are arranged in the air collector interior space 22, namely a first throttle element 60 and a second throttle element 62, of the air supply apparatus 10. Here, the first throttle element 60 is assigned to the first intake manifold 40, whereas the second throttle element 62 is assigned to the second intake manifold 50.

In the present case, the throttle elements 60, 62 are configured as respective throttle valves and serve to set respective air quantities which can be fed via the intake manifolds 40, 50 to the cylinders 102, 104. The throttle elements 60, 62 are coupled in each case to an actuating element 70 which is configured as a shaft. The actuating element 70 is likewise arranged in the air collector interior space 22, just like the throttle elements 60, 62, and is mounted rotatably via at least two bearings 72, 74, namely a first bearing 72 and a second bearing 74. The first bearing 72 can be connected to the first intake manifold end portion 42, whereas the second bearing 74 can be connected to the second intake manifold end portion 52.

Any actuating elements of the air supply device 10 or the internal combustion engine 100, which may be actuated via the actuating element 70 can be actuated, are not shown in further detail in the present case. Depending on whether a purely mechanical or an electric actuation of the actuating element 70 is to take place, these actuating elements can be configured, for example, as a lever, a control cable or as an electric motor, to name only a few examples.

By way of adjustment, in the present case by way of rotation, of the actuating element 70, the throttle elements 60, 62 which are coupled to the actuating element 70 can be adjusted jointly and in the process synchronously with the actuating element 70. Although FIG. 2 and FIG. 3 show the throttle elements 60, 62 in sectioned form, it can be seen that the throttle elements 60, 62 are situated in each case in a closed position, in which a particularly small air quantity can flow past the respective throttle elements 60, 62 in the direction of the cylinders 102, 104. By way of rotation of the actuating element 70 (here, of the shaft), the throttle elements 60, 62 can be adjusted and in the process pivoted in an infinitely variable manner between the closed position and an open position which is not shown in further detail in the present case and in which a correspondingly greater air quantity can flow past the respective throttle elements 61, 62 in the direction of the cylinders 102, 104.

The air supply apparatus 10 is generally an apparatus for gas exchange control of the internal combustion engine 100. Instead of arranging the throttle valves (here, throttle elements 60, 62) in the vicinity of a cylinder head of the internal combustion engine 100, in particular on an induction pipe, such as is the case, for example, in conventional, powerful motorcycles, the throttle elements 60, 62 of the present air supply apparatus 10 are instead arranged in the air collector interior space 22, as a result of which an obstruction, due to the arrangement of the throttle elements 60, 62, of a rider of the motorcycle (motor vehicle K) can be avoided. In addition, in the case of the air supply apparatus 10, a common adjustment of the throttle elements 60, 62 can take place by way of the single actuating element 70 (here, the shaft). The throttle elements 60, 62 can be adjusted, that is to say can be opened and closed, jointly by way of the common shaft, however, it being possible for long induction paths of the (filtered) air which flows through the respective intake manifold interior spaces 41, 51 and therefore the crosstalk of the individual cylinders 102, 104 to be avoided. In the case of systems which are known from the prior art, in contrast, each throttle valve is assigned in each case one actuating apparatus, which is associated with a complicated actuation of the respective throttle valves.

A restriction of legroom of the rider of the motorcycle overall can be reduced by way of the arrangement of the throttle elements 60, 62 in the air collector interior space 22 and therefore within the air collector 20 as part of the air supply apparatus 10 which can also be called an intake system of the internal combustion engine 100.

LIST OF DESIGNATIONS

10 Air supply apparatus
12 Overlap region
20 Air collector
22 Air collector interior space
24 Filter container
26 Clean air region
28 Removal region
30 First inflow channel
32 Second inflow channel
34 First air collector wall region
36 Second air collector wall region
40 First intake manifold
41 First intake manifold interior space
42 First intake manifold end portion
43 First center axis
44 First inlet opening
46 First intake manifold portion
50 Second intake manifold
51 Second intake manifold interior space
52 Second intake manifold end portion
53 Second center axis
54 Second inlet opening
56 Second intake manifold portion
60 First throttle element
62 Second throttle element
70 Actuating element
72 Bearing
74 Bearing
100 Internal combustion engine
102 First cylinder
104 Second cylinder
K Motor vehicle
R Direction
x Longitudinal extent direction
y Transverse extent direction
z Vertical extent direction

The invention claimed is:

1. An air supply apparatus for an internal combustion engine, the air supply apparatus comprising: at least one air collector; and at least two intake manifolds which are connected to the at least one air collector, wherein each intake manifold of the at least two intake manifolds is configured to supply air to respective cylinders of the internal combustion engine, wherein the air supply apparatus is configured to couple to the cylinders such that the cylinders are located on a first end of the air supply apparatus in a first direction, wherein each intake manifold of the at least two intake manifolds includes respective intake manifold end portions which are respectively assigned to a corresponding inlet opening of at least one inlet opening, such that an air collector interior space of the at least one air collector is in fluid communication with respective intake manifold interior spaces of the at least two intake manifolds, wherein the air collector interior space is in fluid communication with the intake manifold interior spaces to the cylinders, wherein the respective intake manifold end portions of the at least two intake manifolds terminate in the air collector interior space and overlap on a common overlap region in at least one direction, the at least one direction being oriented perpendicularly with respect to at least one center axis of at least one of the intake manifold end portions and oriented toward the first end of the air supply apparatus in the first direction, wherein the air supply apparatus comprises at least two throttle elements for setting respective air quantities which can be fed to the cylinders via the at least two intake manifolds, wherein the at least two throttle elements are coupled to an actuating element configured to jointly adjust the throttle elements, and wherein the at least one actuating element includes a shaft oriented along the at least one direction.

2. The air supply apparatus according to claim 1, wherein the at least one inlet opening includes at least a first inlet opening and a second inlet opening, and wherein the first inlet opening faces away from the second inlet opening.

3. The air supply apparatus according to claim 1, wherein at least one throttle element of the at least two throttle elements is arranged in the air collector interior space.

4. The air supply apparatus according to claim 1, wherein each throttle element of the at least two throttle elements is adjustable synchronously via the actuating element.

5. The air supply apparatus according to claim 1, wherein the at least two throttle elements are configured as respective throttle valves.

6. An internal combustion engine with an air supply apparatus according to claim 1.

7. The internal combustion engine according to claim 6, wherein the internal combustion engine comprises at least two cylinder banks, and at least one of the cylinders is assigned to in each case one of the cylinder banks.

8. A motorcycle with an air supply apparatus according to claim 1.

9. A motorcycle having an internal combustion engine according to claim 6.

10. An air supply apparatus for an internal combustion engine, comprising: an air collector; and a first intake manifold and a second intake manifold, wherein the first intake manifold and the second intake manifold are each connected to the air collector, wherein each of the first intake manifold and the second intake manifold is configured to supply air to a respective cylinder of the internal combustion engine, wherein the air supply apparatus is configured to couple to the cylinders such that the cylinders are located on a first end of the air supply apparatus in a first direction, wherein the first intake manifold includes a first intake manifold end portion which is assigned to a first inlet opening such that an air collector interior space of the air collector is in fluid communication with a first intake manifold interior space of the first intake manifold, wherein the second intake manifold includes a second intake manifold end portion which is assigned to a second inlet opening such that an air collector interior space of the air collector is in fluid communication with a second intake manifold interior space of the second intake manifold, wherein the air collector interior space is in fluid communication with each of the first intake manifold interior space and the second intake manifold interior space, wherein each of the first intake manifold and the second intake manifold terminate in the air collector interior space, wherein the first intake manifold and the second intake manifold overlap on a common overlap region in at least one direction, the at least one direction being oriented perpendicularly with respect to a center axis of the first intake manifold end portion and oriented toward the first end of the air supply apparatus in the first direction, wherein the air supply apparatus comprises at least two throttle elements for setting respective air quantities which can be fed to the cylinders via the first intake manifold and the second intake manifold, wherein the at least two throttle elements are coupled to an actuating element configured to jointly adjust the throttle elements, and wherein the at least one actuating element includes a shaft oriented along the at least one direction.

11. The air supply apparatus according to claim 10, wherein the first inlet opening faces away from the second inlet opening.

12. The air supply apparatus according to claim 10, wherein at least one throttle element of the at least two throttle elements is arranged in the air collector interior space.

13. The air supply apparatus according to claim 10, wherein each throttle element of the at least two throttle elements is adjustable synchronously via the actuating element.

14. The air supply apparatus according to claim 10, wherein the at least two throttle elements are configured as respective throttle valves.

15. A motorcycle with an air supply apparatus according to claim 10.

16. An internal combustion engine with an air supply apparatus according to claim 10.

* * * * *